(12) United States Patent
Dowty et al.

(10) Patent No.: US 11,345,476 B2
(45) Date of Patent: May 31, 2022

(54) ARRANGEMENTS FOR AIRCRAFT PASSENGER CABINS WITH PRIVACY DIVIDER CONFIGURATIONS

(71) Applicant: B/E Aerospace, Inc., Winston-Salem, NC (US)

(72) Inventors: Mark B. Dowty, Rural Hall, NC (US); Eric J. Aulet, Winston-Salem, NC (US); Ian L. Frost, Winston-Salem, NC (US); Shirley E. Govea Bravo, Winston-Salem, NC (US); John R. Kuyper, Winston-Salem, NC (US); Robert J. Lawrence, King, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 227 days.

(21) Appl. No.: 16/715,676

(22) Filed: Dec. 16, 2019

(65) Prior Publication Data

US 2020/0262562 A1    Aug. 20, 2020

Related U.S. Application Data

(60) Provisional application No. 62/806,957, filed on Feb. 18, 2019.

(51) Int. Cl.
*B64D 11/06*    (2006.01)
*B64C 1/14*    (2006.01)

(52) U.S. Cl.
CPC ........ *B64D 11/0606* (2014.12); *B64C 1/1423* (2013.01); *B64C 1/1484* (2013.01); *B64D 11/064* (2014.12); *B64D 11/0641* (2014.12)

(58) Field of Classification Search
CPC ............ B64D 11/0606; B64D 11/0023; B64D 11/064; B64D 11/0641; B64C 1/1423; B64C 1/1484; E04B 2/827
See application file for complete search history.

(56) References Cited

U.S. PATENT DOCUMENTS

| | | | | |
|---|---|---|---|---|
| 2,657,436 A | * | 11/1953 | Fairhurst | ................ E04B 2/827 52/64 |
| 3,235,915 A | * | 2/1966 | Glaser | .................... E04B 2/827 52/64 |

(Continued)

FOREIGN PATENT DOCUMENTS

| | | |
|---|---|---|
| EP | 2825458 A1 | 1/2015 |
| WO | 2005080196 A1 | 9/2005 |
| WO | 2016164564 A1 | 10/2016 |

OTHER PUBLICATIONS

Extended Search Report for European Application No. 19215998.6 dated Jul. 21, 2020, 9 pages.

*Primary Examiner* — Christopher D Hutchens
(74) *Attorney, Agent, or Firm* — Suiter Swantz pc llo

(57) ABSTRACT

Arrangements for an aircraft passenger cabin including a seating area containing first and second passenger seats, a monument disposed at one end of the seating area, and at least one privacy divider deployable in a longitudinal direction of the seating area to divide at least a portion of the seating area for privacy. In some embodiments, the at least one privacy divider includes a first privacy divider adapted to deploy to divide the seating area forward of the first and second passenger seats and a second privacy divider deployable to the seating area between the first and second passenger seats.

9 Claims, 9 Drawing Sheets

(56) References Cited

U.S. PATENT DOCUMENTS

| | | | |
|---|---|---|---|
| 4,597,549 A * | 7/1986 | Ryan | B64C 1/10 160/127 |
| 5,022,454 A * | 6/1991 | Kobayashi | E05D 15/0608 160/197 |
| 5,794,381 A | 8/1998 | Rizkovsky | |
| 6,257,523 B1 * | 7/2001 | Olliges | B61D 17/048 160/210 |
| 7,367,159 B2 | 5/2008 | Delgado et al. | |
| 8,375,638 B2 | 2/2013 | Martin et al. | |
| 8,464,469 B2 | 6/2013 | Oberheide | |
| 8,579,006 B2 | 11/2013 | Levin | |
| 8,720,827 B2 * | 5/2014 | Boren | E06B 3/921 244/129.5 |
| 8,806,807 B2 | 8/2014 | Rees | |
| 8,944,377 B2 * | 2/2015 | McIntosh | B61D 35/005 244/118.5 |
| 2005/0001097 A1 | 1/2005 | Saint-Jaimes | |
| 2006/0170261 A1 * | 8/2006 | Baatz | B64D 11/06 297/245 |
| 2011/0138692 A1 | 6/2011 | Lemstra | |
| 2012/0038587 A1 * | 2/2012 | Alford | B64D 11/0606 345/174 |
| 2014/0353425 A1 * | 12/2014 | Boren, Jr. | B64D 11/04 244/118.5 |
| 2015/0166183 A1 * | 6/2015 | Henshaw | B64D 11/0641 244/118.6 |
| 2015/0210393 A1 * | 7/2015 | Savian | B64D 11/0015 244/118.6 |
| 2016/0009359 A1 * | 1/2016 | Perkins | B64D 11/0646 244/118.6 |
| 2016/0122022 A1 * | 5/2016 | Cooke | B64D 11/0605 244/118.6 |
| 2016/0297531 A1 | 10/2016 | Simeon et al. | |
| 2018/0105273 A1 * | 4/2018 | Robinson | B64D 11/0605 |
| 2018/0281961 A1 * | 10/2018 | Mariat | B64D 11/0601 |
| 2018/0281964 A1 * | 10/2018 | Carlioz | B64D 11/0604 |
| 2018/0312127 A1 | 11/2018 | Lalague | |
| 2019/0248498 A1 * | 8/2019 | Kimizuka | B64D 11/06 |
| 2019/0315468 A1 * | 10/2019 | White | B64D 11/0641 |
| 2019/0329891 A1 * | 10/2019 | Bonnefoy | B64D 11/0606 |
| 2020/0277059 A1 * | 9/2020 | Ng | B64D 11/0601 |

* cited by examiner

ARRANGEMENTS FOR AIRCRAFT PASSENGER CABINS WITH PRIVACY DIVIDER CONFIGURATIONS

BACKGROUND

Aircraft passenger cabins are typically divided into different seating classes such as economy, business and first, among other seating classes. Seat type, pitch, density and passenger amenities vary among the different seating classes. Privacy also varies among the different seating classes, with minimal privacy in economy classes and maximum privacy in first class.

In certain situations, it may be necessary or desirable to enhance or relax the degree of privacy in a seating area, and particularly between adjacent seats. For example, to comply with safety requirements it may be necessary to keep open a seat egress path during taxi, take-off and landing (TTOL) in the event of an emergency. In other situations, it may be necessary or desirable to leave a seating area open during boarding, deplaning and meal service, and divide a seating area for sleeping, working or when using a video monitor. Privacy may also depend on the relationship between adjacent passengers.

Conventional partitions typically deploy to occupy only a portion of the space between adjacent seats. For example, partitions may deploy vertically from within a console positioned between adjacent seats or may rotate into position from between adjacent backrests. These dividers require furniture to be positioned between the seats to house the divider when stowed as well as contain the partition deployment mechanism. The need for furniture to house the partition requires the seats to be spaced farther apart than may be desired. Other conventional dividers such as walls are either immovable or do not stow fully out of the space between the seats. With these conventional configurations it is not possible to position laterally adjacent seats close together, for example, to form a double bed.

Accordingly, what is needed are privacy divider configurations for use with different seat arrangements adapted to provide degrees of privacy from partial to full privacy between adjacent seats.

BRIEF SUMMARY

To achieve the foregoing and other advantages, in a first aspect, the present invention provides an arrangement for an aircraft passenger cabin including a seating area containing a first passenger seat and a second passenger seat, a monument disposed forward of the seating area, a guide track disposed between the first and second passenger seats, and at least one privacy divider deployable along the guide track to divide at least a portion of the seating area.

In some embodiments, the at least one privacy divider may stow within the monument and deploy outside of the monument in a direction of the first and second passenger seats.

In some embodiments, in the at least one privacy divider may include a first privacy divider and a second privacy divider, wherein the first privacy divider may stow within the monument and deploy outside of the monument in a direction of the first and second passenger seats to divide a first portion of the seating area forward of the first and second passenger seats, and the second privacy divider may be disposed outside of the monument and deploy to divide a second portion of the seating area between the first and second passenger seats.

In some embodiments, the first privacy divider may deploy to meet one end of the second privacy divider such that when the first privacy divider is fully deployed the first and second privacy dividers together may form one continuous privacy divider dividing the seating area in a longitudinal direction.

In some embodiments, the at least one privacy divider may include a plurality of coupled panels including a drive panel and at least one driven panel, wherein the drive panel and the at least one driven panel are coupled such that movement of the drive panel causes movement of the at least one driven panel.

In some embodiments, the first and second passenger seats may be parallel and laterally aligned and may be configured to adjust between upright and lie flat.

In some embodiments, the at least one privacy divider may include a first privacy divider that deploys horizontally from within the monument in a direction toward the first and second passenger seats to divide a first portion of the seating area forward of the first and second passenger seats, and a second privacy divider disposed between the first and second passenger seats that may deploy vertically upward to divide a second portion of the seating area between the first and second passenger seats.

In some embodiments, the at least one privacy divider may be a swinging door hinged to the monument.

In some embodiments, the at least one privacy divider may include a plurality of coupled panels each configured to translate relative to another one of the plurality of separate panels.

In some embodiments, at least one of the plurality of coupled panels includes an internal window which can be selectively opened or closed, the window including a frame embedded in the respective one of the separate panels and a shade slidable within the frame.

According to a second aspect, the present invention provides a privacy divider assembly adapted for use with a passenger seat arrangement, the privacy divider assembly including a monument adapted to be positioned at one end of a seating area containing first and second passenger seats, a longitudinal guide track disposed between the first and second passenger seats, and at least one privacy divider including at least one panel configured to track along the guide track to divide at least a portion of the seating area.

In some embodiments, the at least one privacy divider may stow within the monument and may deploy in a direction of the first and the second passenger seats, and wherein when deployed the at least one privacy divider may divide a portion of the seating area between the first and second passenger seats, a portion of the seating area forward of the first and second passenger seats, or both the portion of the seating area between the first and second passenger seats and forward of the first and second passenger seats.

According to a third aspect, the present invention provides an arrangement for an aircraft passenger cabin including a seating area containing first and second passenger seats, a monument disposed at one end of the seating area, a guide track disposed between the first and second passenger seats, and at least one privacy divider deployable along the guide track to divide at least a portion of the seating area.

Embodiments of the invention can include one or more or any combination of the above features.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numerals in the drawings may represent and refer to the same or similar element, feature or function. In the drawings.

DETAILED DESCRIPTION OF EXEMPLARY EMBODIMENTS

Figure 1:
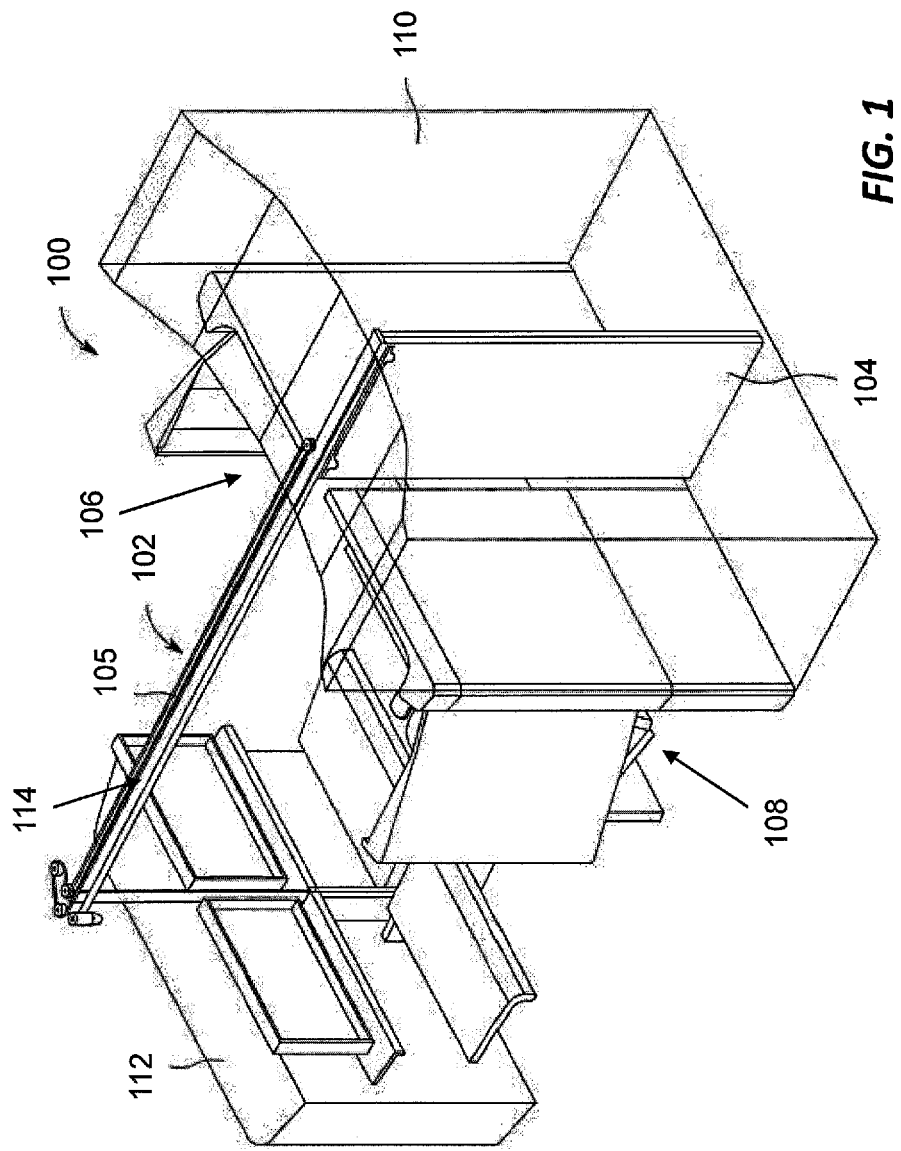
FIG. 1 is a perspective view of an arrangement for an aircraft passenger cabin including a seating area containing first and second passenger seats and privacy divider deployable to divide at least a portion of the seating area in a longitudinal direction.

The inventive concepts are described hereinafter with reference to the accompanying drawings in which exemplary embodiments are shown. However, the inventive concepts may be embodied in many different forms and should not be construed as limited to the representative embodiments set forth herein.

With reference to the drawing figures, disclosed herein are seating arrangements for passenger cabins such as aircraft passenger cabins. The seating areas can be divided utilizing one or more privacy dividers. In some embodiments, the seating areas include first and second adjacent and parallel passenger seats that face the same direction and are closely spaced such that a double bed can be formed when a privacy divider deployable therebetween is stowed. A monument may be positioned at one or both ends of the seating area. In some embodiments, the monument may be positioned at a forward end of the seating area facing the first and second passenger seats and may contain video monitors and amenities for use by passengers. In some embodiments, the monument may be positioned at a rear end of the seating area behind the first and second passenger seats. In either monument position, the monument may serve as a bay for housing a stowed privacy divider. Monuments may be part of another seating group, closet, lavatory, etc., and thus may have functionality in addition to privacy divider stowage.

Privacy divider assemblies may include a single panel or a plurality of panels coupled together, and a mechanism for driving panel movement. Privacy divider and panel deployment may be according to a predetermined deployment sequence. The privacy dividers according to the present invention are particularly suited for business class and first class seating arrangements. In some embodiments, the coupled panels may hang suspended from an overhead track, may track along a floor track, may track along or with vertical posts, or combinations thereof.

Seating areas may have different floorplans and dimensions depending on cabin width, length and seating density. Seats may be paired into groups or units in which seats are laterally adjacent and may be parallel or at an angle to each other. Each seat generally includes a seat bottom and a backrest and may optionally include one or more of a leg rest, armrests, and headrest. Each passenger seat may be configured to transition between an upright sitting position for taxi, take-off and landing (TTOL), and a horizontal or lie flat sleeping position during flight. Intermediate sitting positions may also be achievable by adjusting the angle of one or more of the seat bottom, backrest, leg rest, etc.

Benefits derived from the privacy dividers disclosed herein include, but are not limited to, customizable privacy between adjacent seats, novel seat layouts, customizable deployment sequences, off-floor track positioning, and universal application to various business and first class seating arrangements.

FIG. 1 shows a first seating area 100 which may be part of a passenger cabin. A privacy divider assembly 102 includes a plurality of panels 104 adapted to hang suspended from an elongate overhead beam 105. The panels 104 are configured to deploy between first and second seats 106, 108 to divide the seating area 100 in the longitudinal direction. The panels 104 stow within a first monument 110 positioned at a rear end of the seating area 100 and deploy in a direction of a second monument 112 positioned at a forward end of the seating area. The elongate overhead beam 106 supports at least one guide track 114. A gear assembly for driving panel movement may be housed within the first monument 110, the second monument 112, or elsewhere.

The privacy divider assembly of FIG. 1, and the other privacy divider assemblies disclosed herein, generally include at least one guide track, a panel or plurality of coupled panels configured to track along the at least one guide track, and a drive mechanism for driving panel deployment and stowage. When fully stowed the coupled panels may stack on separate tracks. When fully deployed the plurality of coupled panels may be inline along one track. In a non-limiting example, the number of tracks may correspond to the number of panels with certain stowage tracks transitioning into a central deployment track. Panels may deploy according to a predetermined deployment sequence and stow according to the reverse of the deployment sequence. Panels may be guided to their respective stowage tracks utilizing guiding means such as mechanical guiding, magnetic attraction, etc.

Suspended panels may be hung with hangers. Each hanger may attach along a top of a respective panel to stabilize the panel and minimize swing. Each hanger may be coupled to a driven element, such as a cable or drive belt, and may have a roller that rolls along the guide track(s). Hangers may be secured to the driven element utilizing a set screw tightened against the element passing through a post hole. Cable pulleys may be used to guide and organize the drive element(s).

Drive elements may be driven by a drive mechanism such as an intermittent gear assembly. A non-limiting example of an intermittent gear assembly may include a motor driven shaft, a plurality of intermittent driver gears, a plurality of driven gears, and a plurality of cable pulleys. The motor driven shaft may be driven by a motor that may be affixed to a bottom of a gear box and coupled to the motor driven shaft through a worm gear or other arrangement. The plurality of intermittent driver gears may be rotatably coupled to the motor driven shaft with the number of intermittent driver gears corresponding to the number of panels of the divider assembly. The plurality of driven gears may be each meshed with one of the plurality of intermittent driver gears and may be rotatably coupled to a driven shaft, wherein the number of driven gears and shafts may correspond to the number of intermittent driver gears. A plurality of pulleys may each be rotatably coupled to one of the plurality of driven shafts with the number of pulleys corresponding to the number of driven gears. In this configuration, each of the plurality of pulleys may be configured to drive motion of one of the plurality of driven cables coupled to one of the plurality of suspended panels.

Intermittent driver gears may have a predetermined tooth configuration and relative fixed position on the motor-driven shaft with respect to the other ones of the plurality of intermittent driver gears to deploy the plurality of hanging panels according to a predetermined deployment sequence. For example, the intermittent driver gears may be arranged and configured to deploy one panel first, a second panel second, a third panel third, etc. Deployment sequences may include, but are not limited to, linking two panels to deploy in sequence with a delay in deploying the third panel, deploying each panel separately with a delay between deployments, deploying all panels in sequence with no delay between deployments, deploying only one panel for TTOL, deploying two panels for TTOL, deploying all three panels for TTOL, etc. Deployment may be controlled by the intermittent gear assembly configuration and a control system operable for activating the motor and motor direction according to the predetermined deployment sequence.

An alternative drive mechanism may include an endless belt configuration wherein one of the panels is coupled to an endless belt operable for driving panel deployment.

Divider panels may be coupled together. A driven or leading panel may move to deploy a following panel and so on. In this arrangement, panels may be linked such that when a first panel reaches an engagement position the panel engages a following panel to pull the following panel, and so on. For example, a driven panel may carry a spring-loaded lever arm that engages a pin affixed to a second panel when the first panel reaches a predetermined position, and the second panel may carry a spring-loaded lever arm that engages a pin affixed to a third panel, etc. Other coupling mechanisms are possible.

Figure 2:
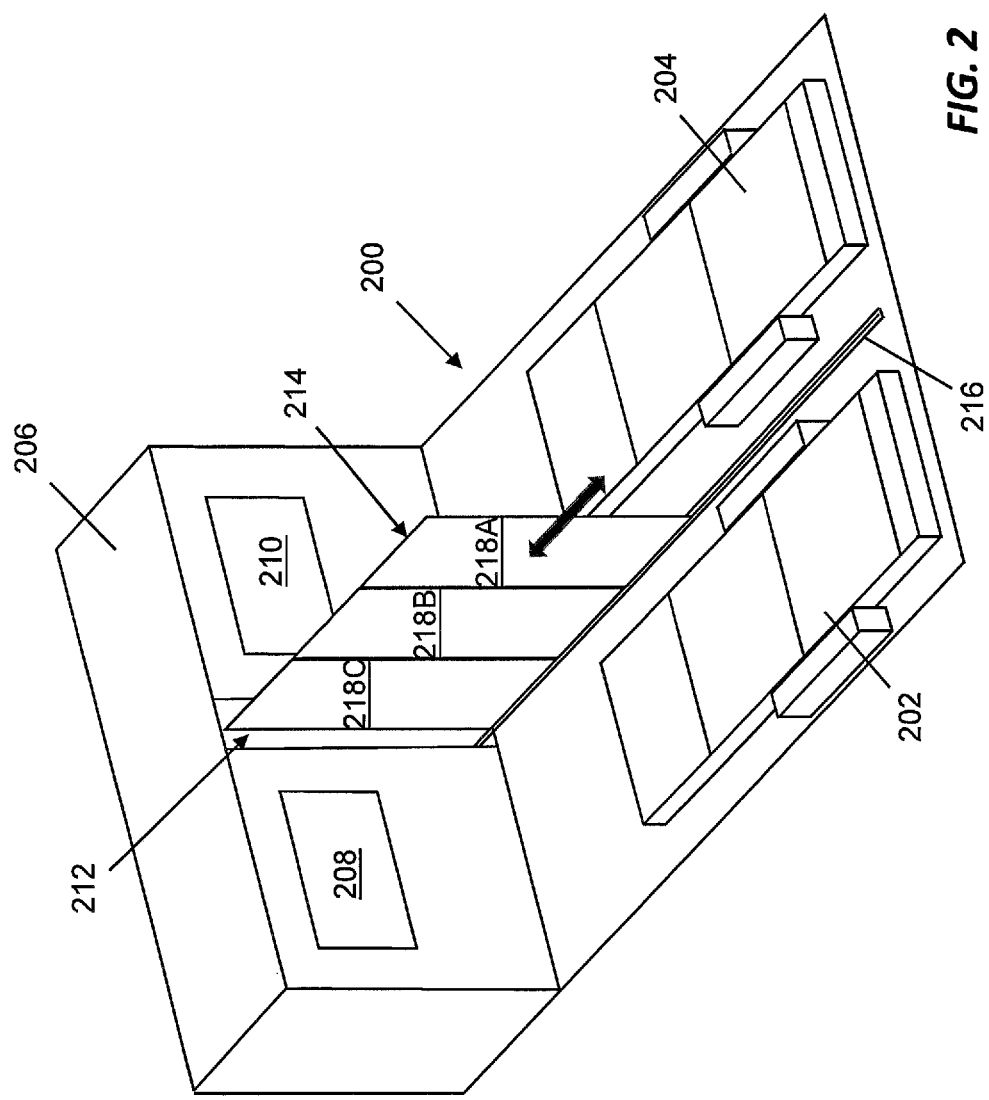
FIG. 2 is a perspective view of an arrangement for an aircraft passenger cabin including a privacy divider which deploys horizontally from within a monument.

FIG. 2 shows a second seating area 200 which may be part of a passenger cabin. The second seating area 200 contains first and second passenger seats 202, 204 positioned parallel, laterally aligned, and facing the same direction. A monument 206 positioned forward of the seating area faces the seats. First and second monitors 208, 210 supported by the monument 206 face the respective first and second seats 202, 204. A central elongate opening 212 through the seat-facing side of the monument 206 serves as an entrance/exit for a privacy divider 214. The privacy divider 214 stows within the monument 206 and deploys between the first and second seats 202, 204 to divide the seating area in the longitudinal direction. An elongate guide track 216 embedded in the floor supports the privacy divider 214 and guides the movement thereof as the privacy divider tracks between its stowed and deployed positions. The guide track 216 extends from within the monument to a position behind the seats such that substantially the entire longitudinal extent of the seating area 200 can be divided.

In keeping with the example of FIG. 1, the privacy divider 214 includes a plurality of panels 218A, 218B, 218C coupled together for deployment according to a predetermined deployment sequence. For example, a first panel 218A may serve as a drive panel for driving movement of driven panels 218B and 218C, with the first panel 218A being driven according to the drive mechanism discussed above. Deployment may be initiated by passenger or crew, and the privacy divider 214 may be partially or fully deployed as desired. For example, the privacy divider 214 may be dimensioned to fill substantially the entire longitudinal length of the seating area 200 when the divider is fully deployed. In an alternative embodiment, the privacy divider 214 when fully deployed may have a length shorter than the longitudinal length of the seating area 200, such that the deployed privacy divides a portion of the seating area, for example, forward of the seats 202, 204, between the seats, or portions of each.

Figure 3:
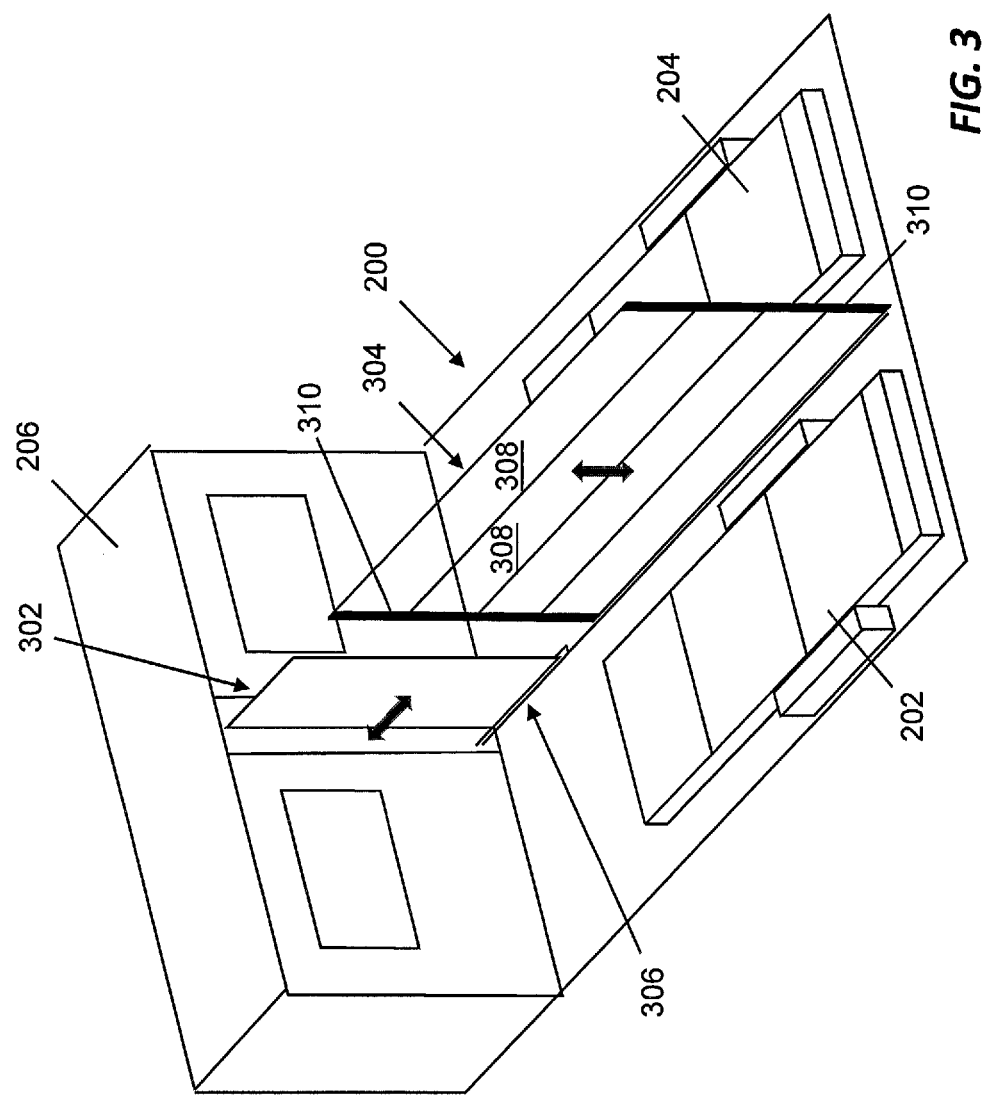
FIG. 3 is a perspective view of an arrangement for an aircraft passenger cabin including two separate privacy dividers which deploy to divide respective portions of the seating area.

FIG. 3 shows the second seating area 200 with another version of a privacy divider configuration for dividing the seating area. The privacy divider configuration includes a first privacy divider 302 and a second privacy divider 304. The first and second privacy dividers 302, 304 are separate and independently deployable such that both can be used together, each can be used alone, or one can be used when the other is stowed. The first privacy divider 302 stows within the monument 206 and deploys in the longitudinal direction to divide a first portion of the seating area 200 forward of the first and second passenger seats 202, 204. The second privacy divider 304 is disposed outside of the monument 206 and deploys vertically upward from the floor to divide a second portion of the seating area 200 between the first and second passenger seats 202, 204. The first privacy divider 302 may track along a guide track 306 disposed in the floor. The second privacy divider 304 may include a plurality of coupled panels 308 that track along or with vertical posts 310. The vertical posts 310 may include telescoping members that deploy from within the floor to a height above the passenger seats. The panels 308 may be coupled to the telescoping members of the posts. The first privacy divider 302 may deploy to meet one end of the second privacy divider 304 such that when both privacy dividers are fully deployed the first and second privacy dividers together form one continuous privacy divider dividing substantially the longitudinal extent of the seating area 200. The second privacy divider 304 may stow fully in the floor or to a height of one panel section having a height less than the seat height. In this configuration, stowage of the second privacy divider 304 allows the two seats 202, 204 to form a continuous double bed.

Figure 4:
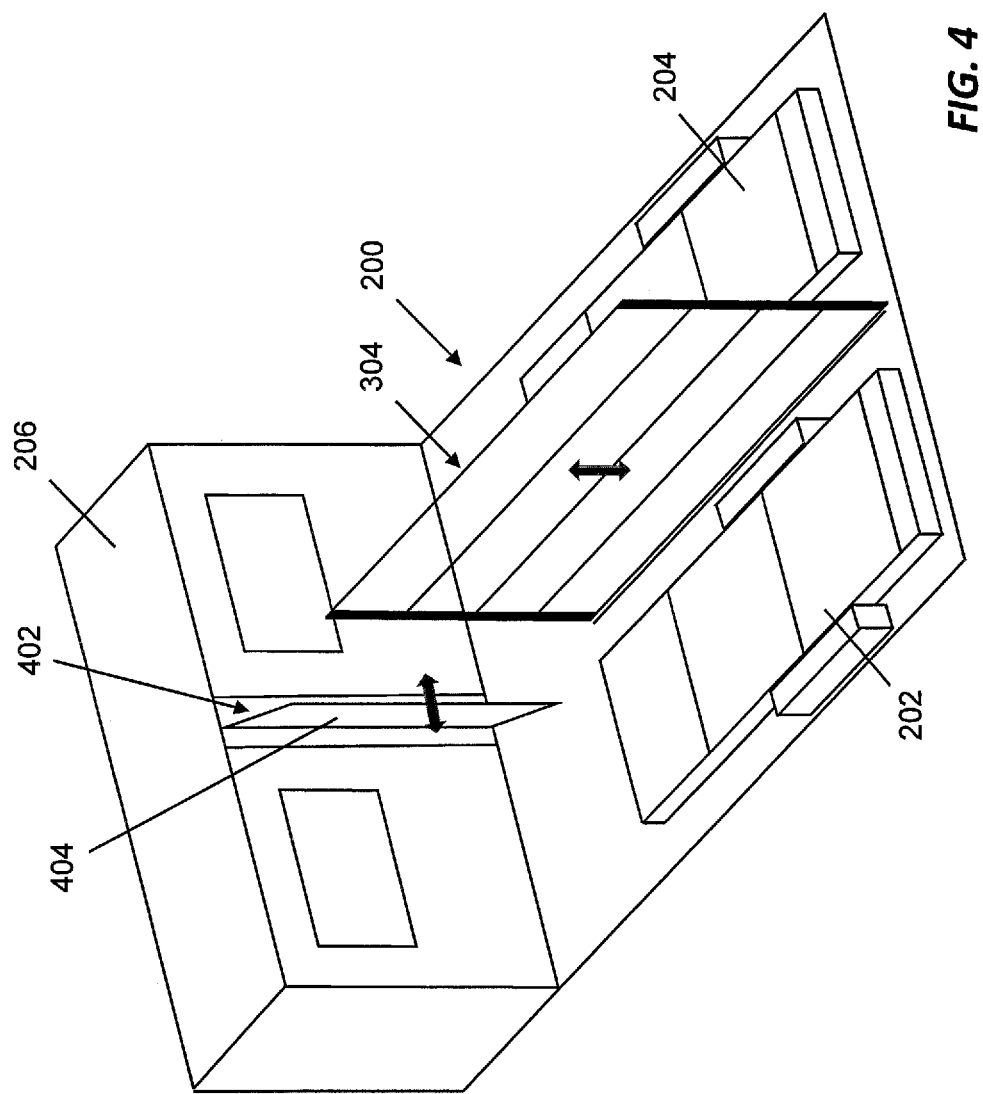
FIG. 4 is a perspective view of an arrangement for an aircraft passenger cabin including a deployable privacy divider and a swinging door.

FIG. 4 shows the second seating area 200 with first and second privacy dividers. The second privacy divider 304 is the same as that shown in FIG. 3. The first privacy divider 402 is a swinging door 404 having a single panel hingedly coupled along one side to the monument 206. The door 404 can be swung in opposing directions for lateral egress through the seating area 200 and can be positioned perpendicular to the face of the monument 206 to meet the near end of the second privacy divider 304 to form one continuous partition. The free end of the door 404 can be latched to the second privacy divider 304 to maintain the door "closed." In keeping with FIG. 3, the two privacy dividers are separate and independently deployable such that both can be used together, each can be used alone, or one can be used when the other is stowed.

Figure 5:
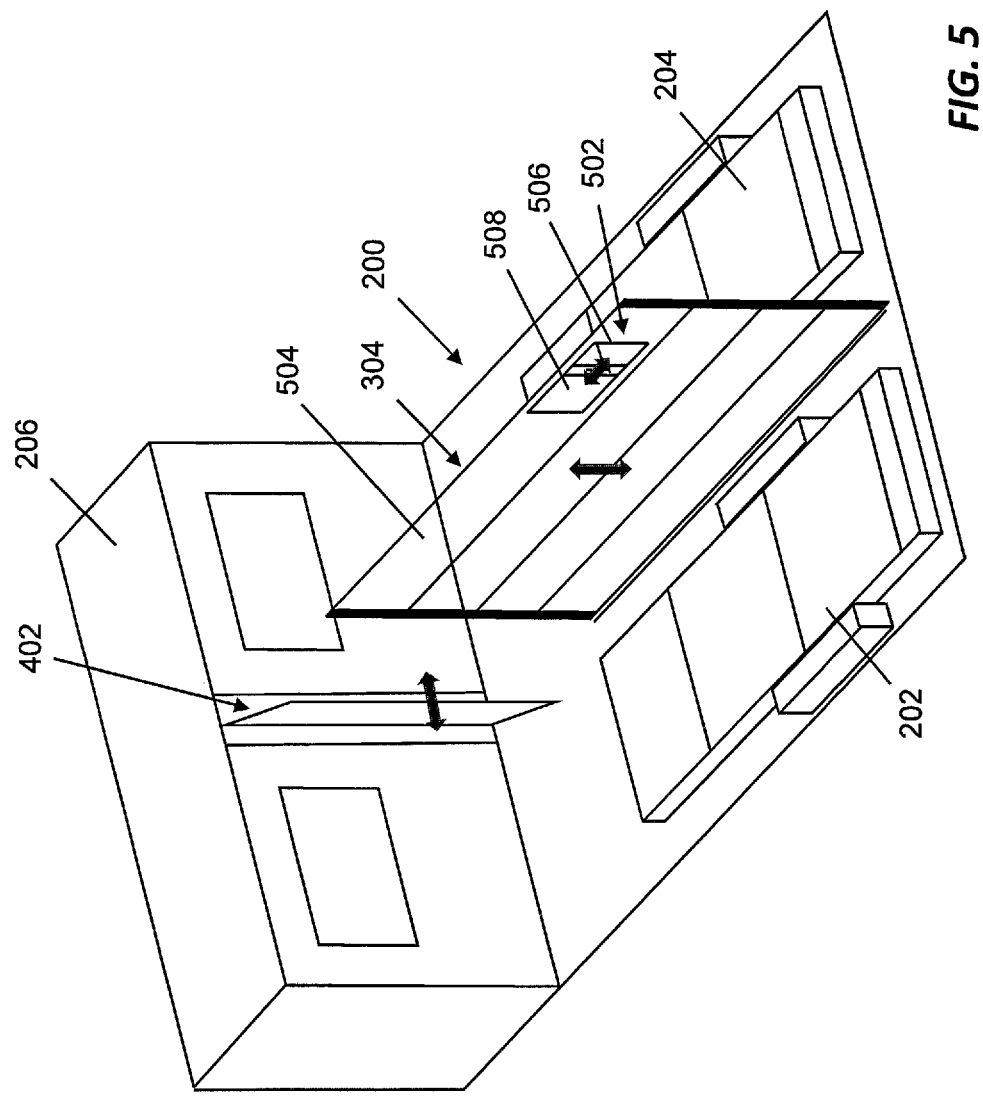
FIG. 5 is a perspective view of an arrangement for an aircraft passenger cabin further illustrating a window disposed in a panel of a privacy divider.

FIG. 5 shows the second seating area 200 with the first and second privacy 402, 304 dividers of FIG. 4, and with the second privacy divider 304 including a window assembly 502. The window assembly 502 is disposed in one panel 504 of the second privacy divider 304. The window assembly 502 includes a frame 506 embedded in the panel 504 and a shade 508 slidable in the frame. The shade 508 can be opened or closed as desired and permits communication between the adjacent passengers without having to stow the second privacy divider 304. In keeping with FIGS. 3 and 4, the two privacy dividers are separate and independently deployable such that both can be used together, each can be used alone, or one can be used when the other is stowed.

Figure 6:
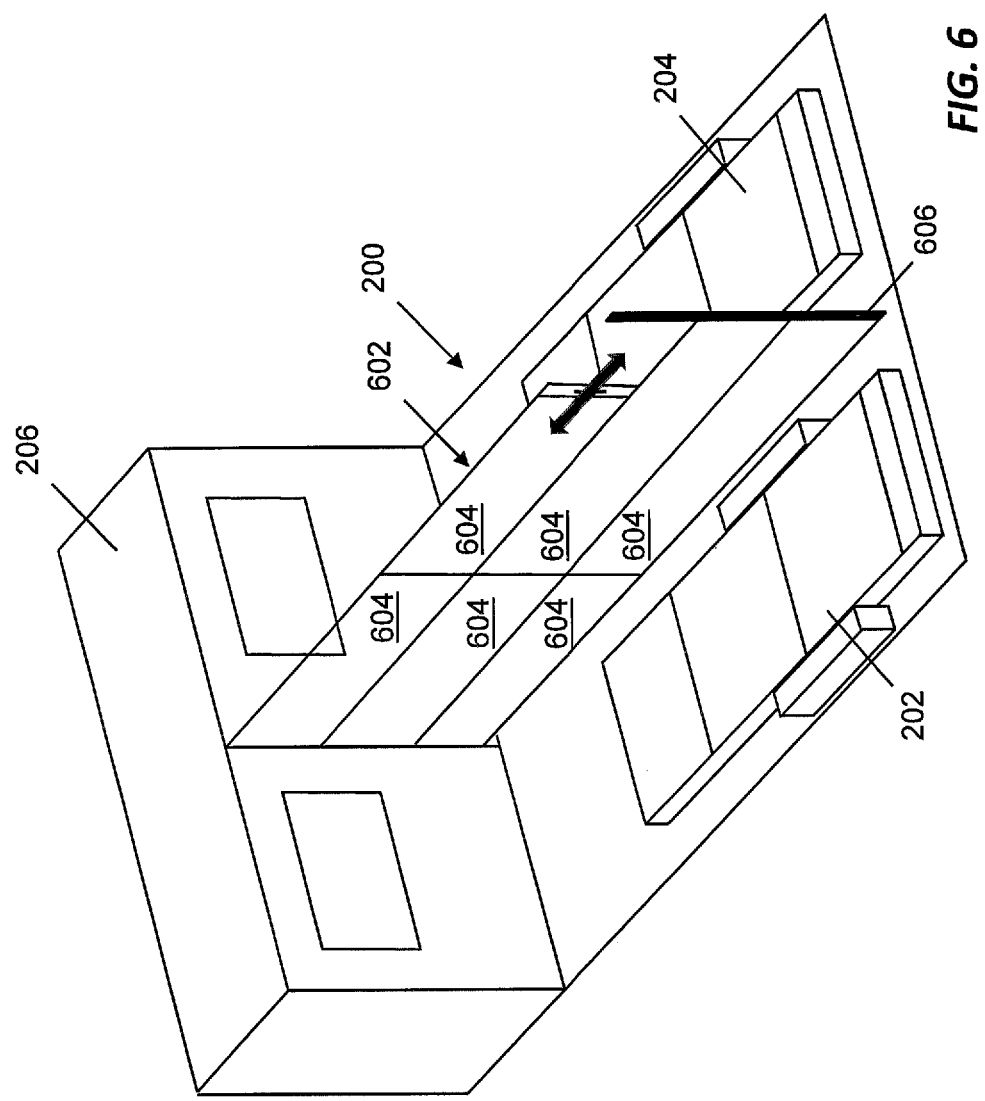
FIG. 6 is a perspective view of an arrangement for an aircraft passenger cabin including a privacy divider including a plurality of coupled translating panels.

FIG. 6 shows the second seating area 200 with another version of a privacy divider for dividing the seating area. The single privacy divider 602 stows within the forward monument 206 and deploys in the longitudinal direction between the first and second seats 202, 204. Separate panels 604 deploy in the longitudinal direction to meet and attach to a deployable vertical post 606. The separate panels 604 allow a customizable divider height from partial to full height of the monument 206. The vertical post 606 may stow within the floor and the panels 604 may be retractable sections windable on a spool assembly.

Figure 7:
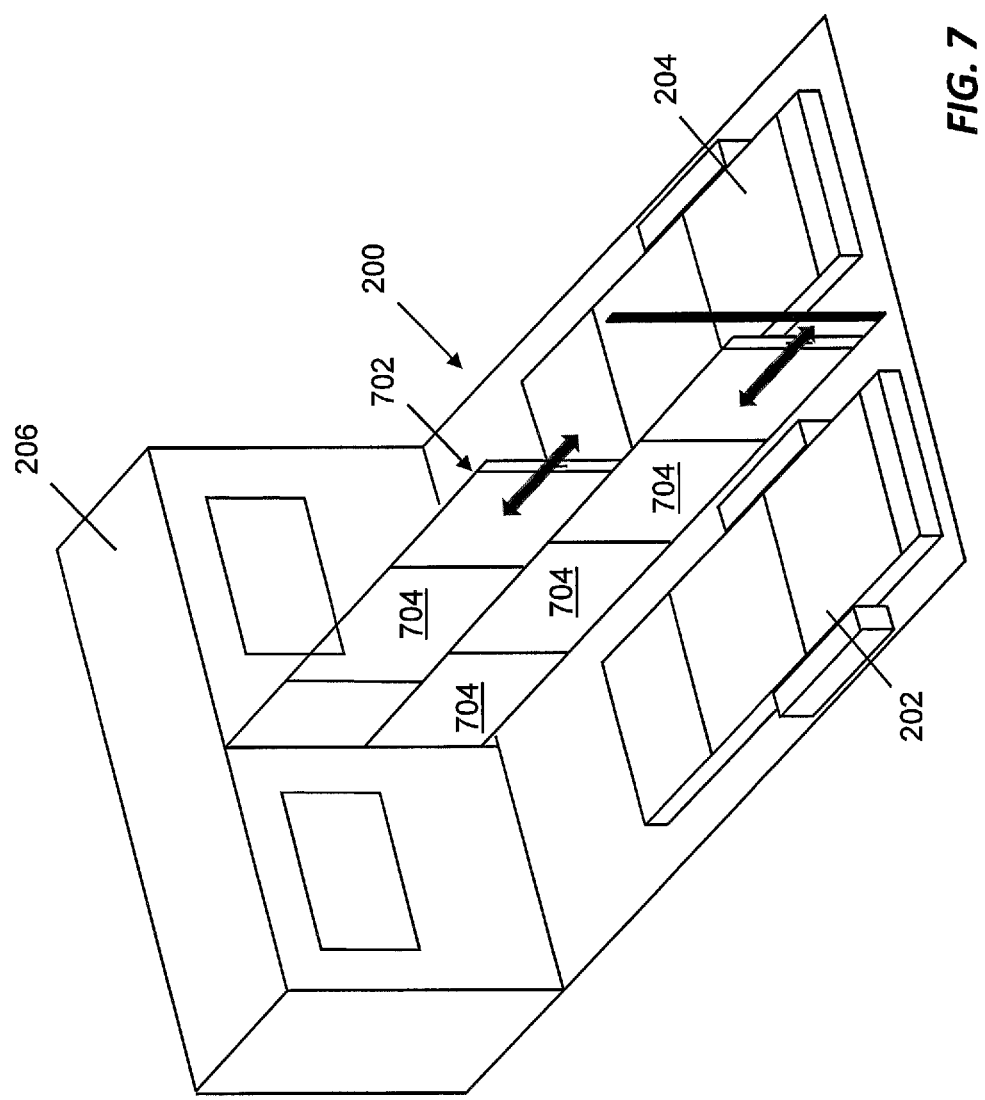
FIG. 7 is a perspective view of an arrangement for an aircraft passenger cabin including a deployable privacy divider assembly.

FIG. 7 shows the second seating area 200 with another version of a privacy divider for dividing the seating area. The single privacy divider 702 stows within the forward monument 206 and deploys in the longitudinal direction between the first and second seats 202, 204. Separate divider sections 704 deploy in the longitudinal direction to meet and attach to a vertical post as discussed with FIG. 6 above. Each divider section 704 may include a plurality of coupled sections and one divider section may track atop another.

Figure 8:
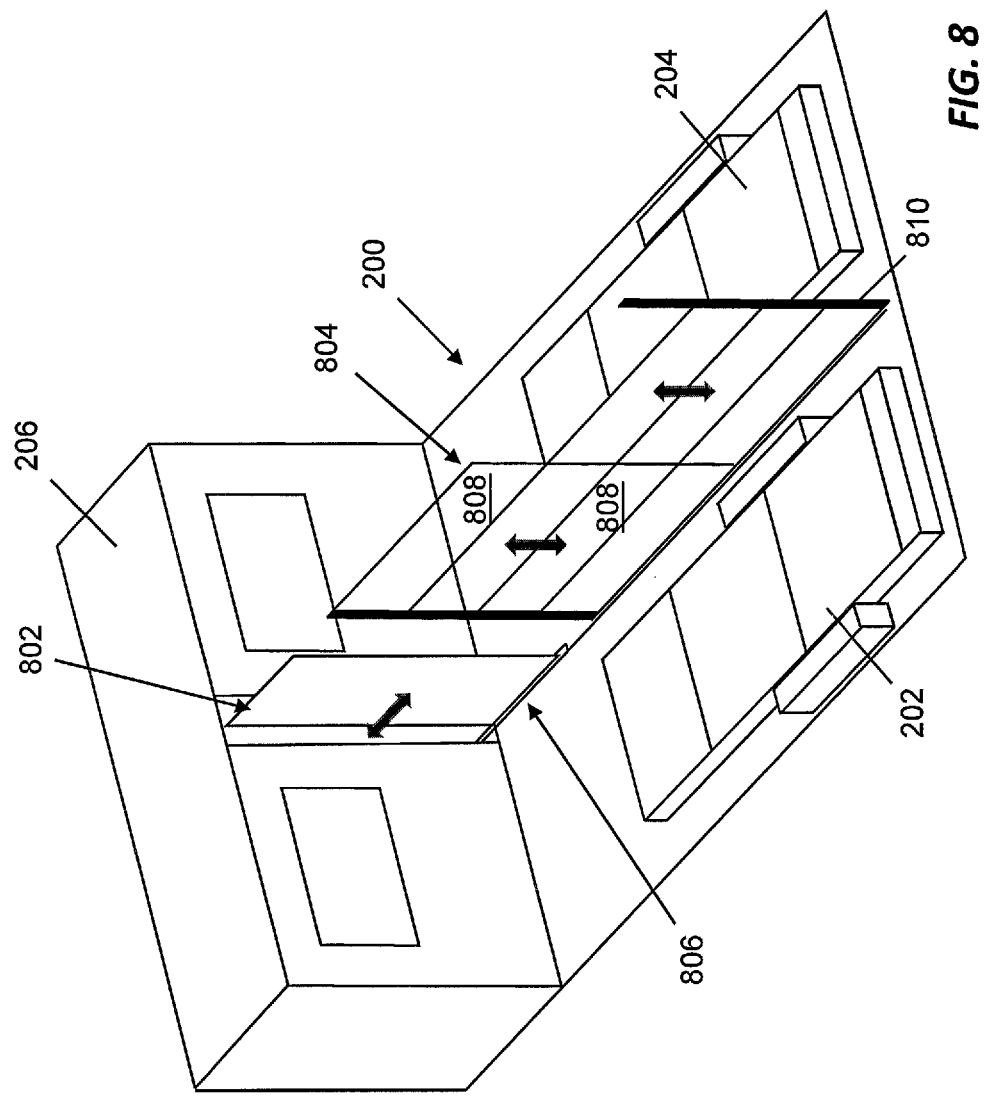
FIG. 8 is a perspective view of an arrangement for an aircraft passenger cabin including first and second privacy dividers wherein the first privacy divider deploys horizontally and the second privacy divider deploys vertically.

FIG. 8 shows the second seating area 200 with another version of a privacy divider for dividing the seating area. In keeping with FIG. 3, the privacy divider configuration includes a first privacy divider 802 and a second privacy divider 804. The first and second privacy dividers 802, 804 are separate and independently deployable such that both can be used together, each can be used alone, or one can be used when the other is stowed. The first privacy divider 802 stows within the monument 206 and deploys in the longitudinal direction to divide a first portion of the seating area 200 forward of the first and second passenger seats 202, 204. The second privacy divider 804 is disposed outside of the monument 206 and includes separate sections that deploy independently vertically upward from the floor to divide second portions of the seating area 200 between the first and second passenger seats 202, 204. The first privacy divider 802 may track along a guide track 806 disposed in the floor. The second privacy divider 804 may include a plurality of coupled panels 808 that track along or with vertical posts 810. The vertical posts 810 may include telescoping members that deploy from within the floor to a height above the passenger seats. The panels 808 may be coupled to the telescoping members of the posts. The second privacy divider sections may stow fully in the floor or to a height of one panel section having a height less than the seat height.

Figure 9:
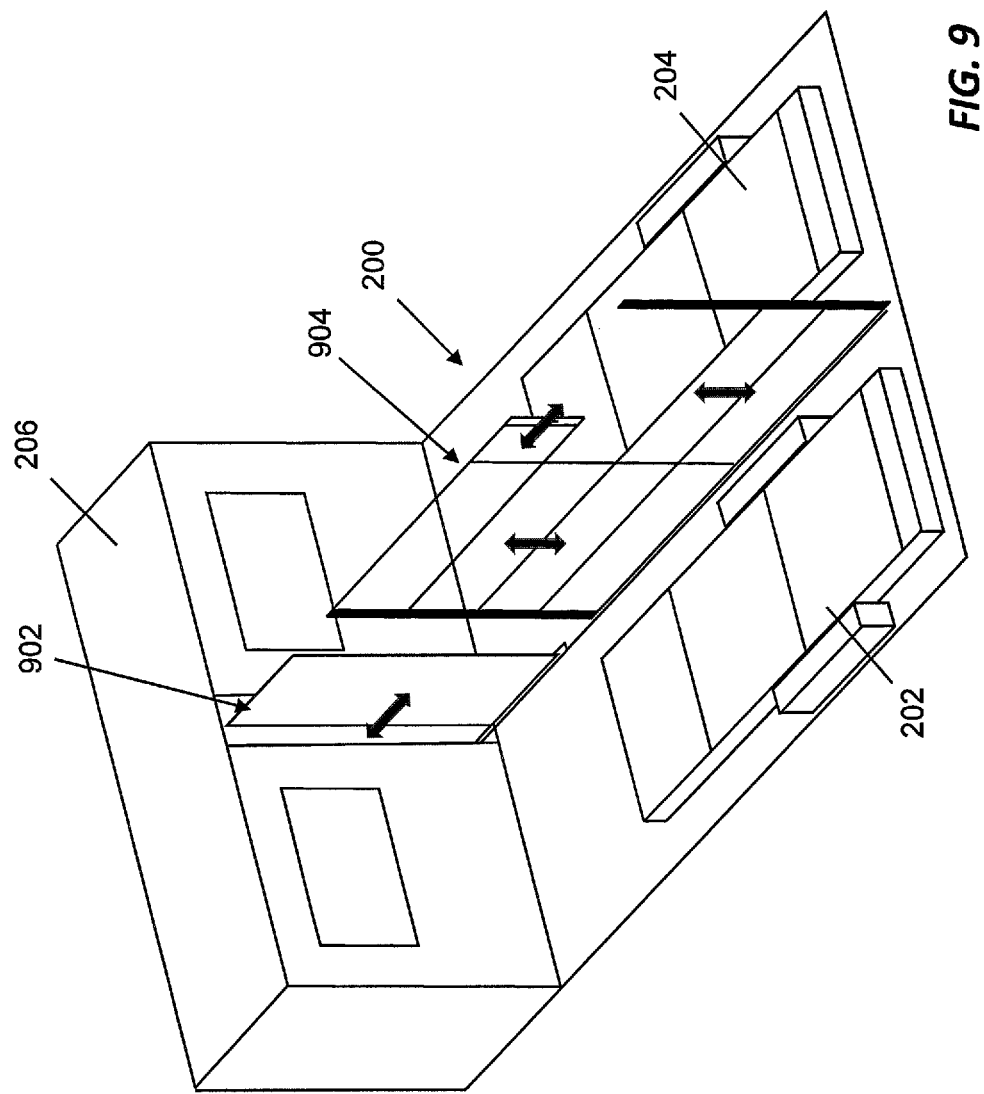
FIG. 9 is a perspective view of an arrangement for an aircraft passenger cabin including privacy dividers with vertically and horizontally movable coupled panels.

FIG. 9 shows the second seating area 200 with another version of a privacy divider for dividing the seating area. In keeping with FIGS. 3 and 8, the privacy divider configuration includes a first privacy divider 902 and a second privacy divider 904. The first and second privacy dividers 902, 904 are separate and independently deployable such that both can be used together, each can be used alone, or one can be used when the other is stowed. The first privacy divider 902 stows within the monument 206 and deploys in the longitudinal direction to divide a first portion of the seating area 200 forward of the first and second passenger seats 202, 204. The second privacy divider 904 is disposed outside of the monument 206 and includes separate sections that deploy independently vertically upward from the floor to divide second portions of the seating area 200 between the first and second passenger seats 202, 204. Sections of the second privacy divider 904 may also translate horizontally relative to adjacent sections. Vertical and/or horizontal adjustment allows certain sections to be deployed while others stowed. Individual sections may be flexible and retractable to be wound on a spool assembly.

The foregoing description provides embodiments of the invention by way of example only. It is envisioned that other embodiments may perform similar functions and/or achieve similar results. Any and all such equivalent embodiments and examples are intended to be covered by the appended claims.

What is claimed is:

1. An arrangement for an aircraft passenger cabin, comprising:
    a seating area including a first passenger seat and a second passenger seat;
    a monument disposed forward of the seating area;
    a guide track disposed in a floor of the seating area, at least a portion of the guide track disposed between the first and second passenger seats;
    a first privacy divider deployable along the guide track to divide a first portion of the seating area, wherein the first privacy divider stows within the monument and deploys outside of the monument in a direction of the first and second passenger seats to divide the first portion of the seating area forward of the first and second passenger seats; and
    a second privacy divider, separate from the first privacy divider, configured to deploy vertically upward from the guide track to divide a second portion of the seating area between the first and second passenger seats.

2. The arrangement according to claim 1, wherein the first privacy divider deploys to meet one end of the second privacy divider such that when the first privacy divider is fully deployed the first and second privacy dividers together form one continuous privacy divider dividing the seating area in a longitudinal direction.

3. The arrangement according to claim 1, wherein the second privacy divider comprises a plurality of coupled panels including a drive panel and at least one driven panel, wherein the drive panel and the at least one driven panel are coupled such that movement of the drive panel causes movement of the at least one driven panel.

4. The arrangement according to claim 1, wherein the first and second passenger seats are parallel and laterally aligned and are configured to adjust between upright and lie flat.

5. The arrangement according to claim 1, wherein the second privacy divider comprises a plurality of coupled panels, each of the coupled panels configured to translate relative to another one of the plurality of coupled panels.

6. The arrangement according to claim 5, wherein at least one of the plurality of coupled panels includes an internal window which can be selectively opened or closed, the window including a frame embedded in the respective one of the coupled panels and a shade slidable within the frame.

7. A privacy divider assembly adapted for use with a passenger seat arrangement, the privacy divider assembly comprising:
- a monument adapted to be positioned at one end of a seating area containing first and second passenger seats;
- a longitudinal guide track disposed between the first and second passenger seats; and
- at least one privacy divider including at least one panel configured to track along the guide track to divide at least a portion of the seating area;

wherein:
the at least one privacy divider comprises a plurality of coupled panels each configured to translate relative to another one of the plurality of coupled panels; and
at least one of the plurality of coupled panels includes a window configured to be selectively opened or closed, the window including a frame embedded in the respective one of the separate panels and a shade slidable within the frame.

8. The assembly according to claim 7, wherein the at least one privacy divider stows within the monument and deploys in a direction of the first and second passenger seats, and wherein when deployed the at least one privacy divider divides a portion of the seating area between the first and second passenger seats, a portion of the seating area forward of the first and second passenger seats, or both the portion of the seating area between the first and second passenger seats and forward of the first and second passenger seats.

9. The assembly according to claim 7, wherein the at plurality of coupled panels includes a drive panel and at least one driven panel, wherein the drive panel and the at least one driven panel are coupled such that movement of the drive panel causes movement of the at least one driven panel.

\* \* \* \* \*